Oct. 10, 1933.    J. W. NEVIN    1,930,369
WINDOW CLEANER'S SEAT
Filed June 28, 1932    2 Sheets-Sheet 2
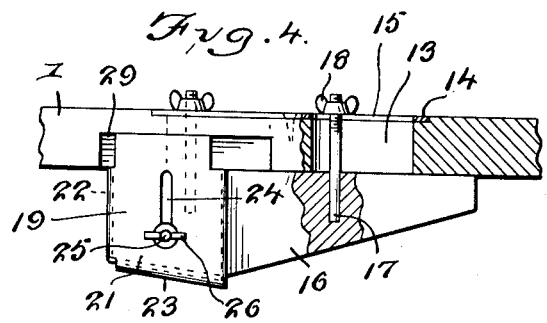
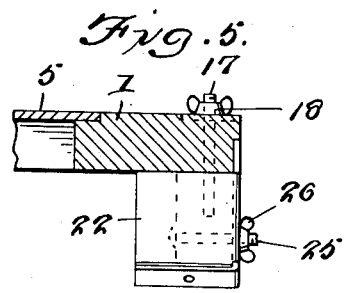
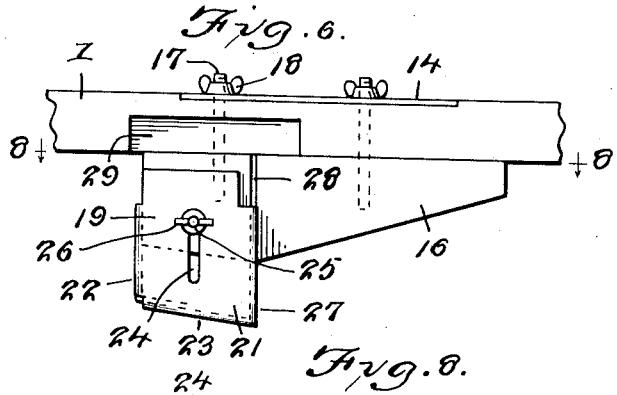
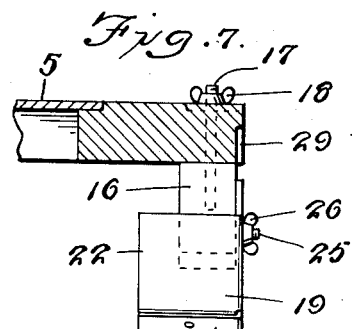
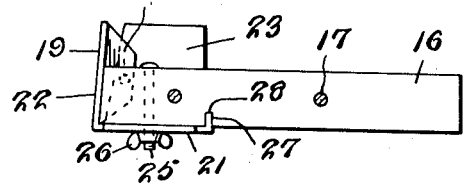
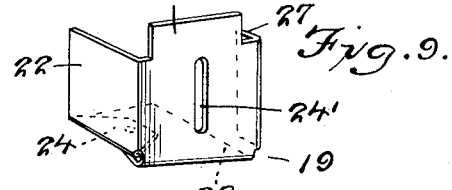
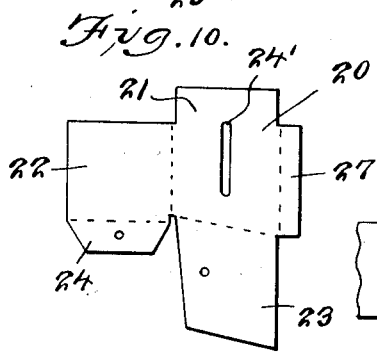
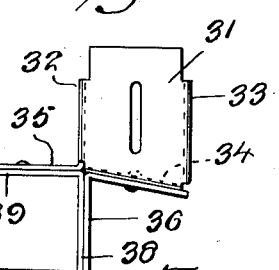
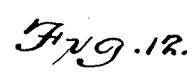
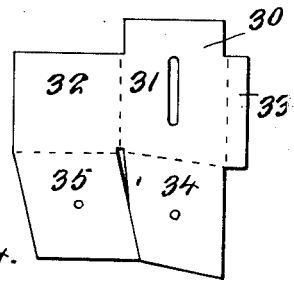
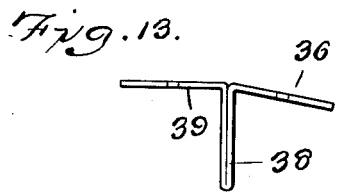
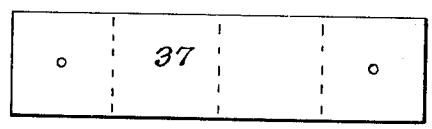
Joseph W. Nevin    INVENTOR
BY Victor J. Evans & Co.
ATTORNEY Patented Oct. 10, 1933

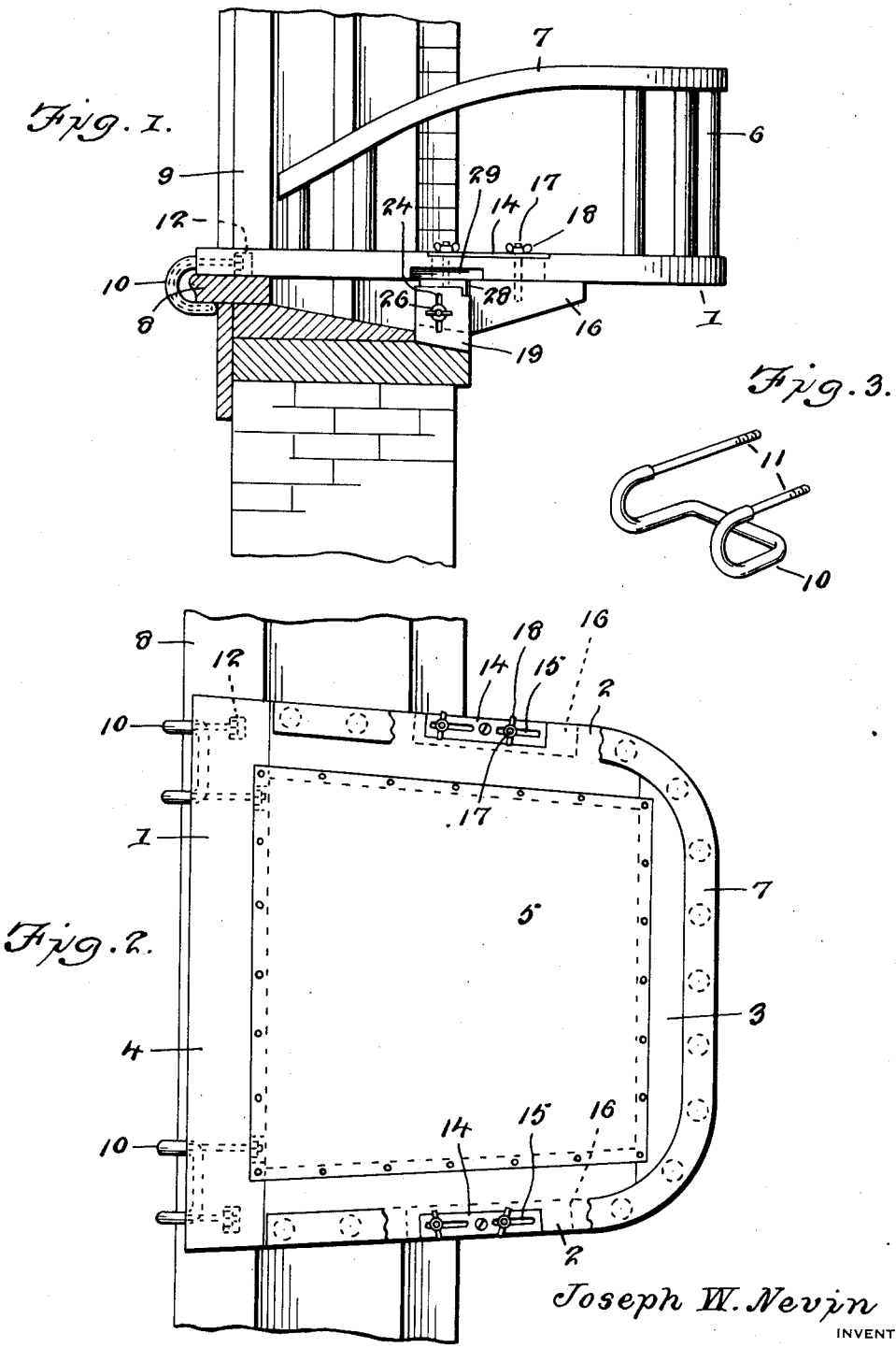

1,930,369

UNITED STATES PATENT OFFICE 1,930,369

WINDOW CLEANER'S SEAT

Joseph W. Nevin, West View, Pa.

Application June 28, 1932. Serial No. 619,772

1 Claim. (Cl. 304—24)

This invention relates to seats especially adapted for use by window cleaners and for other similar purposes and has for the primary object, the provision of a device of the above stated character which may be employed with the utmost safety and provides a comfortable seat for the user.

Another object of this invention is the provision of means for removably securing the seat to a window frame without danger of its becoming accidentally detached when in use and which may be readily adjusted to fit different types of window frames or the sills thereof.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a seat applied to a window frame and constructed in accordance with my invention.

Figure 2 is a top plan view illustrating the same.

Figure 3 is a perspective view illustrating one of the clamps to engage a stool of a window frame.

Figure 4 is a fragmentary sectional view illustrating the means of adjustably securing one of the supporting bars to the seat and an elevator thereto.

Figure 5 is a fragmentary sectional view taken at right angles to Figure 4 showing the association of the elevator with the seat and its respective supporting bar.

Figure 6 is a fragmentary side elevation showing the elevator in an adjusted position.

Figure 7 is a fragmentary sectional view taken at right angles to Figure 6 showing the elevator in an adjusted position.

Figure 8 is a fragmentary sectional view taken on the line 8—8 of Figure 6.

Figure 9 is a perspective view illustrating one of the elevators.

Figure 10 is a plan view illustrating the blank from which the elevator is constructed.

Figure 11 is a fragmentary side elevation illustrating a modified form of elevator.

Figure 12 is a plan view illustrating the blank from which the modified form of elevator is constructed.

Figure 13 is a side elevation illustrating a window sill engaging element employed in connection with the modified form of elevator.

Figure 14 is a plan view illustrating the blank from which the window sill engaging element is constructed.

Referring in detail to the drawings, the numeral 1 indicates a seat frame which consists of side members 2, a rear member 3, and a front member 4. The side members 2 converge slightly toward the rear member 3 and the latter has its ends curved to meet with the converging ends of the side members. A seat 5 is secured to the frame 1. Spaced vertically disposed runs 6 are secured to the side and rear members 2 and 3 and carry a rail 7, the forward ends of which curve downwardly toward the front of the seat. The runs 6 and rails 7 cooperate in forming an effective back rest or guard for a person sitting upon the seat. The front member 4 rests flatly upon the stool 8 of a window frame 9 with the seat 1 projecting outwardly of the window. The front member 4 carries stool engaging clamps 10 covered with rubber or any other material suitable to prevent marring of the surface of the stool 8 and each includes a single length of material bent into hook formation with parallel ends 11 which are screw threaded and one end shorter than the other end as shown in Figure 3. Horizontally disposed openings are drilled in the front member 4 to receive the ends 11 of the clamp. One of the openings extends entirely through the member 4 so that a nut may be applied to one of the ends 11 directly under the seat 5 while the other opening communicates with a vertically disposed recess 12 opening outwardly through the bottom face of the member 4 to permit a nut to be applied to the other end 11 of the clamp. With the clamps in engagement with the stool the front end of the seat is firmly anchored in place and this will permit said front end to be easily and quickly applied and removed when desired.

The side members 2 are provided with slots 13 covered by wear plates 14 provided with slots 15. Supporting bars 16 engage the under face of the side members 2 and carry threaded bolts 17 that extend through the slots 13 and 15 to receive wing nuts 18 whereby supporting bars are adjustably secured to the seat frame and are capable of adjustment endwise relative to the side members 2 of said seat frame. The inner ends of the supporting bars are disposed over the outer edges of the window sill while the outer ends of the supporting bars terminate a substantial distance from the window sill to support the side members 2 of the seat frame a considerable distance beyond the window sill.

Elevators 19 are adjustably secured to the supporting bars and rest upon the window sill as shown in Figure 1 and each includes a blank 20 bent to form plates 21 and 22 arranged angularly to each other and the plates 21 and 22 have formed thereon plates 23 and 24 respectively and they extend angularly to the plates 21 and 22 and are secured together forming a bottom to the elevator. The bottom is disposed on a slight inclination to rest evenly on the top surface of the window sill or frame as shown in Figure 1. The plate 21 is provided with a slot 24' to receive a bolt 25 carried by the respective supporting bar and on which is threaded a wing nut 26 permitting the elevator to be adjusted vertically. The plate 21 has formed on one edge a rightangularly disposed extension 27 fitting in a vertical groove 28 formed in the supporting bar. The side rail above the respective supporting bar is grooved or channelled as shown at 29 to permit the upper end of the elevator to move therein when in one of its adjusted positions. It will be seen that the elevators may be readily adjusted on the supporting bars so that the seat frame when resting upon the stool 8 may be supported in a horizontal position and cooperate with the bars and clamps in firmly anchoring the seat in position against accidental displacement. The inner ends of the supporting bars are shaped to slant from the outside to the inside at approximately six degrees less than at rightangles to conform to the plates 23 of the elevators 19. The inner surfaces of both the supporting bars and the elevators are shaped to approximately six degrees less than at rightangles, so as to form the desired contact with the sill to make this function of the assembly effective.

Referring to my modified form of elevators as shown in Figures 11 to 14, each consists of a blank 30 consisting of plates 31 and 32 bent angularly to each other and a right-angularly disposed extension 33 of the plate 31 fitting in the groove 28 of the respective supporting bar. Extensions 34 and 35 are formed on the plates 31 and 32 respectively and the extension 35 forms the bottom wall of the elevator. The plate 31 is slotted to receive the bolt 25 of the supporting bar. A window sill engaging element 36 of substantially T-shape is formed from a blank 37 and the head portion is riveted or otherwise secured to the extensions 34 and 35 of the elevator so that when applied to a window frame, the vertical portion 38 will engage the outer vertical surface of the window sill while the horizontal portion 39 will rest on the upper surface of the sill positioning the elevator outwardly of the window frame.

The outer ends of the supporting bars 16 extend further from the center of gravity of the seat than the inner ends to permit said outer ends to sustain a greater thrust where required and thereby provide rigidity to the rear of the seat.

The clamps 10 when in engagement with the stool 8 prevents sidesway or tipping back out of the window of the device by the operator. The supporting bars and their respective elevators along with the clamps afford a simple and efficient means for locking the seat to members of the window frame and permit adjustment so that the seat will fit different window frames and allow the seat to be firmly set in place and obviating the possibility of the seat becoming loose or moving from side to side or from dropping back or out of the window which would endanger the safety of the operator.

While I have shown and described the preferred embodiment of my invention, it will be understood that minor changes in construction, combination and arrangement of parts may be made without departing from the spirit and scope of my invention, as claimed.

Having thus described my invention, what I claim is:

A window cleaner's seat comprising horizontal supporting bars having vertical guide grooves, a seat portion resting on said bars, means connecting said bars to the seat portion to permit the latter to be adjusted horizontally on said bars, elevators carried by the bars and each including angularly related walls to engage angular faces of a window sill, means adjustably connecting the elevators to the bars, flanges on said elevators and received by the guide grooves, and means on the seat portion to engage the window sill.

JOSEPH W. NEVIN.